United States Patent
Trivedi et al.

(10) Patent No.: US 11,268,014 B2
(45) Date of Patent: Mar. 8, 2022

(54) METHOD OF RECOVERING OIL EMBEDDED IN AN UNDERGROUND MATRIX ADJACENT A DEPLETED OIL RESERVOIR

(71) Applicant: The Governors of the University of Alberta, Edmonton (CA)

(72) Inventors: Japan Trivedi, Edmonton (CA); Madhar Sahib Azad, Edmonton (CA)

(73) Assignee: The Governors of the University of Alberta, Edmonton (CA)

(*) Notice: Subject to any disclaimer, the term of this patent is extended or adjusted under 35 U.S.C. 154(b) by 0 days.

(21) Appl. No.: 16/937,188

(22) Filed: Jul. 23, 2020

(65) Prior Publication Data

US 2021/0024811 A1    Jan. 28, 2021

Related U.S. Application Data

(60) Provisional application No. 62/879,245, filed on Jul. 26, 2019.

(51) Int. Cl.
*E21B 43/16*   (2006.01)
*C09K 8/588*   (2006.01)

(52) U.S. Cl.
CPC .............. *C09K 8/588* (2013.01); *E21B 43/16* (2013.01)

(58) Field of Classification Search
CPC . E21B 49/0875; E21B 2200/20; C09K 8/584; C09K 2208/30; G01N 11/02
See application file for complete search history.

(56) References Cited

U.S. PATENT DOCUMENTS

| | | | | |
|---|---|---|---|---|
| 2016/0138395 A1* | 5/2016 | Kulkarni | ................. | E21B 44/00 166/250.01 |
| 2017/0174975 A1* | 6/2017 | De Stefano | .............. | C09K 8/36 |
| 2019/0345373 A1* | 11/2019 | Favero | ..................... | C09K 8/68 |
| 2020/0095850 A1* | 3/2020 | Preux | ..................... | C09K 8/588 |

OTHER PUBLICATIONS

Do Hoon Kim, et al., "Development of a Viscoelastic Property Database for EOR Polymers," SPE 129971, 2010 SPE Improved Oil Recovery Symposium, Tulsa, OK, Apr. 24-28, 2010 (16 pp).

Nahn Ju Kim, et al., "Capillary breakup extenesional rheometry of a wormlike micellar solution," Korea-Austialia Rheology Journal, vol. 22, No. 1, Mar. 2020, pp. 31-41.

(Continued)

*Primary Examiner* — Silvana C Runyan
(74) *Attorney, Agent, or Firm* — Blue Filament Law PLLC

(57) ABSTRACT

A method of recovering oil embedded in an underground matrix adjacent a depleted oil reservoir includes injecting a mixture of polymeric material into the depleted oil reservoir through an injection borehole, applying a pressure to the mixture to free the oil from the matrix and move the oil towards a production well, and drawing the oil from the depleted oil reservoir through the production well. The method additionally includes modeling a shear thickening of the polymeric mixture and an onset of the shear thickening. The model can be incorporated into commercial numerical simulators for predicting the injectivity and recovery due to viscoelastic thickening independently and thereby assist in quick screening polymers for oil recovery applications.

10 Claims, 14 Drawing Sheets

(56) References Cited

OTHER PUBLICATIONS

R.R. Jennings, et al., "Factors Influencing Mobility Control By Polymer Solutions," Journal of Petroleum Technology, Mar. 1971, pp. 391-401.
G.J. Hirasaki, et al., "Analysis of Factors Influencing Mobility and Adsorption in the Flow of Polymer Solution Through Porous Media," Socient of Petroleu Engineers Journal, Aug. 1974, pp. 337-346.
Ming Han, et al., "Laboratory Investigation of the Injectivity of Sulfonated Polymer Solutions into Carbonate Reservoir Rocks," SPE 155390, SPE EOR Conference at Oil and Gas West Asia held in Muscat, Oman, Apr. 16-18, 2012.
Graham M. Harrison, et al., "Comparison of dumbell-based theory and experiment for a dilute polymer solution in a corotating two-roll mill," Journal of Rheology 43(1), Jan./Feb. 1999, pp. 197-218.
J. Heemskerk, et al., "Quantification of Viscoelastic Effects of Polyacrylamide Solutions," SPE/DOE 4th Symposium of Enhanced Oil Recovery, Tulsa, OK Apr. 15-18, 1984.
W.B. Gogarty, "Mobility Control With Polymer Solutions," Society of Petroleum Engineers Journal, Jun. 1967, pp. 161-173.
Ali A. Garrouch, et al., "A Viscoelastic Model for Polymer Flow in Reservoir Rocks," 1999 Spe Asia Pacific Oil and Gas Conference and Exhib, Jakarta, Indonesia, Apr. 20-22, 1999, pp. 1-10.
Gerald G. Fuller, et al., "Extensional Viscosity Measurements for Low-Viscosity Fluids," Journal of Rheology 31, 1987, pp. 235-249.
V.M. Entov, et al., "Effect of a spectrum of relaxation times on the capillary thinning of a filament of elastic liquid," J. Non-Newtonian Fluid Mech., 72 (1997), pp. 31-53.
Mojdeh Delshad, et al., "Mechanistic Interpretation and Utilization of Viscoelastic Behavior of Polymer Solutions for Improved Polymer-Flood Efficiency," 2008 SPE/DOE Improved Oil Recovery Symposium, Tulsa, OK, Apr. 19-23, 2008, pp. 1-15.
C. Clasen, et al., "How dilute are dilute solutions in extensional flows?," Journal of Rheology 50(6), Nov./Dec. 2006, pp. 849-881.
A. Clarke, et al., "How Viscoelastic-Polymer Flooding Enhances Displacement Efficiency," Jun. 2018 SPE Journal, pp. 675-687.
Guy Chauveteau, "Molecular Interpretation of Several Different Properties of Flow of Coiled Polymer Solutions Through Porous Media in Oil Recovery Conditions," 56th Annual Fall Technical Conf. and Exh. of the Society of Petroleum Engineers of AIME, San Antonio, TX, Oct. 5-7, 1981.
W.J. Cannella, "Prediction of Xanthan Rheology in Porous Media," 63rd Annual Technical Conf. and Exh of the Society of Petroleum Engineers, Houston, TX, Oct. 2-5, 1988.
Avinash Bhardwaj, et al., "The effect of pre-shear on the extensional rheology of wormlike micelle solutions," Pringer-Verlag 2007, Feb. 9, 2007, pp. 861-875.
Shelley L. Anna, et al., "Elasto-capillary thinning and breakup of model elastic liquids," J. Rheol 45(1), Jan./Feb. 2001, pp. 115-138.
M.S. Azad, et al., "Extending the Applicability of Chemical EOR in High Salinity, High Temperature & Fractured Carbonate Reservoir Through Viscoelastic Surfactants," SPE Saudi Arabia Section Annual Tech Symp. and Exh, Al-khobar, Saudi Arabia, Apr. 21-24, 2014, SPE172188-MS.
Ajana Laoroongroj, et al., "Polymer Flood Incremental Oil Recovery and Efficiency in Layered Reservoirs Including Non-Newtonian and Viscoelastic Effects," SPE Annual Tech. Conf and Exh., Amsterdam, The Netherlands, Oct. 27-29, 2014, SPE-170657-MS.
Yoshihiro Masuda, et al., "1D Simulation of Polymer Flooding Including the Viscoelastic Effect of Polymer Solution," SPE Reservoir Engineering, May 1992, pp. 247-252.
R.J. Marshall, et al., "Flow of Viscoelastic Fluids Through Porous Media," I&EC Fundamentals, vol. 6, No. 3, Aug. 1967.
Ahmed M. Mansour, et al., "In-situ rheology and mechanical degradation of EOR polyacrylamide solutions under moderate shear rates," J. Petroleum Science and Eng, 115 (2014), pp. 57-65.
A. Magueur, et al., "Effect of Successive Contractions and Expansion on the Apparent Viscosity of Dilute Polymer Solutions," Chem. Eng. Comm, 36:1-6, pp. 351-366.
Pengpeng Qi, et al., "Reduction of Residual Oil Saturation in Sandstone Cores Using Viscoelastic Polymers," SPE Improved Oil Recovery Conf., Tulsa, OK, Apr. 11-13, 2016, SPE-179689-MS.
Thesis of Oluwaseun Adedeji Magbagbeola, B.S., "Quantification of the Viscoelastic Behavior of High Molecular Weight Polymers Used for Chemical Enhanced Oil Recovery," The Univ. of Texas at Austin, Dec. 2008.
Thesis of Mei-Kou Yuan, B.S., "A Rheological Study of Polymer and Microemulsion in Porous Media," The Univ. of Texas at Austin, May 1981.
J.P. Plog, et al., "Influence of the Molar Mass Distribution on the Elongational Behaviour of Polymer Solutions in Capillary Breakup," Applied Rheology, Feb. 2005.
David J. Pye, "Improved Secondary Recovery by Conlrol of Water Mobility," Journal of Petroleum Technology, Aug. 1964, pp. 911-916.
Mohammad Ranjbar, et al., "Quantification and Optimization of Viscoelastic Effects of Polymer Solutions for Enhanced Oil Recovery," SPE/DOE Eighty Symposium on Enhanced Oil Recovery, Tulsa, OK, Apr. 22-24, 1992 (SPE/DOE 24154).
Lucy E. Rodd, et al., "Capillary Break-Up Rheometry of Low-Viscosity Elastic Fluids," Applied Rheology, vol. 15, Issue 1, pp. 12-27.
R.S. Seright, et al., "Injectivity Characteristics of EOR Polymers," SPE Reservoir Eval. & Eng., Oct. 2009, pp. 783-792.
P. Schummer, et al., "A New Elongational Rheometer for Polymer Solutions," Jour. of Non-Newtonian Fluid Mechanics, 12, 1983, pp. 331-347.
R.S. Seright, et al., "Rheology of a New Sulfonic Associative Polymer in Porous Media," SPE Reservoir Eval. & Eng., Dec. 2011, pp. 726-734.
Frank W. Smith, "The Behavior of Partially Hydrolyzed Polyacrylamide Solutions in Porous Media," Journal of Petroleum Technology, Feb. 1970, pp. 148-156.
A. Stavland, et al.,"Polymer Flooding—Flow Properties in Porous Media Versus Rheological Parameters," SPE Europe/EAGE Annual Conf. and Exh, Barcelona, Spain, Jun. 14-17, 2010 (SPE131103).
Taha Sochi, "Non-Newtonian flow in porous media," Polymer 51, 2010, pp. 5007-5023.
Wang Weiying, et al., "Viscoelasticity and Rheological Properyt of Polymer Solution in Porous Media," Journal of Jianghan Petroleum Inst., vol. 16, No. 4, Dec. 1994.
Yin, et al., "Study on Flow Behaviors of Viscoelastic Polymer Solution in Micropore With Dead End," 2006 SPE Annual Tech. Conf and Exh., San Antonio, TX, Sep. 24-27, 2006.

\* cited by examiner

METHOD OF RECOVERING OIL EMBEDDED IN AN UNDERGROUND MATRIX ADJACENT A DEPLETED OIL RESERVOIR

CROSS-REFERENCE TO RELATED APPLICATION

This application claims priority of U.S. Provisional Patent Application Ser. No. 62/879,245 filed Jul. 26, 2019, which is incorporated herein by reference.

FIELD OF THE INVENTION

The present invention generally relates to a method of recovering oil from a depleted oil reservoir, and more specifically to an improved method of recovering oil from a depleted oil reservoir that includes modeling a shear thickening of the polymeric mixture and an onset of the shear thickening to accurately predict the flow of the polymeric mixture.

BACKGROUND

Polymer flooding is one of the most commonly used EOR methods for improving the recovery factor in depleted oil reservoirs. Polymers are also used as mobility control agent in surfactant polymer (SP) flooding, alkali polymer flooding (AP) flooding and alkali surfactant polymer (ASP) flooding (Green 1998). A large amount of oil remains as unswept oil in the water flooded reservoir. The amount of unswept oil after water flooding will be higher in the reservoirs characterized by high heterogeneity and high oil viscosity. Water is a Newtonian fluid with the unit viscosity that tends to channel/finger easily through high permeable streaks and high viscous oil. The added polymers viscosify the displacing slugs, control its mobility and thereby provide high sweep efficiency which is essential for higher overall recovery factor. The polymers solutions are non-newtonian and the viscosity exhibited by them would be different at different shear rates. Shear rates are generally high near the wellbore. In the farthest part of the reservoirs, shear rates are generally low due to exposure of flood front to larger area. Shear rates are also dependent on the injection rate, permeability, porosity etc. A reservoir characterized by the high oil viscosity requires high viscosity from polymer solutions for optimal sweep. Injectivity is an issue with slugs providing high viscosity (Seright et al. 2009). Prior determination of the in-situ viscosity exhibited by the displacing slugs is essential for screening and simulation. Core flooding can be performed to determine the in-situ viscosity of polymer solutions. However, chemical EOR (CEOR) is an extensive process. Salinity variances in the reservoir necessitate core flooding to be done at different salinities. Different combinations of chemical EOR slugs include different concentration of surfactant, polymer and alkali. Performing core flooding with respect to these variables is a cumbersome process. Moreover, cores for representative reservoirs are not available in most of the cases, or obtaining the cores is an expensive process. Rheological experiments are performed to determine the in-situ viscosity.

Hydrolyzed polyacrylamide (HPAM) and Xanthan gum are the two commonly used EOR polymers (Green 1998; Garrouch 1999; Seright et al. 2009; Sheng 2010). Xanthan gum is rigid, viscous biopolymer without considerable elasticity. HPAM is the synthetic viscoelastic polymer. Viscoelasticity in HPAM provides higher in-situ viscosity than xanthan gum to the displacing slugs (Sheng 2010). Rheological experiments are performed to measure the viscosity at the desired shear rate and correlating them to the reservoir's shear rate by the appropriate mathematical models. Shear rheological experiments are used extensively in the oil industry for predicting the performance of polymer solutions (Cannela et al. 1988; Seright et al. 2011; Han et al. 2012). Shear rheological experiments are also used for screening the optimal formulation for mobility control purpose (Han et al. 2012; Azad and sultan 2014). The Carreau model, developed based on shear rheology, was successful in matching the porous media behavior for viscous biopolymers that shows thinning in both the bulk shear and porous media (Cannela et al. 1988, Seright et al. 2009). The Carreau model completely under predict the apparent viscosity of viscoelastic polymers (most of the oil field polymers are synthetic viscoelastic polymers). It fails to predict the shear thickening as well as the onset rate (which is important as it reflects the flow in porous media). This can be seen from the Figures. For case of heavy oil recovery applications in particular, polymers with high elasticity are employed. The Carreau model is given by the Equation 1.

$$\mu_{app} = \mu_\infty + (\mu_p^\circ - \mu_\infty)[1+(\lambda\gamma)]^{(n-1)/\alpha} \qquad \text{Equation (1):}$$

Where:
$\mu_{app}$=Apparent viscosity, Pa·s.
$\mu_\infty$=Upper Newtonian viscosity, Pa·s.
$\mu_p^\circ$=Lower Newtonian viscosity, Pa·s;
$\lambda$=Characteristic relaxation time, s
$\gamma$=Shear rate, /s
n=Shear thinning index.
$\alpha$=Constant equal to 2.

All these parameters are attained through bulk shear rheology. These parameters are sufficient to explain the purely viscous polymer behavior in porous media (Cannela et al., 1988). Thus, shear rheology could predict the viscous polymer behavior in the porous media through bulk measurements without the aid of core flooding.

As early in 1960s and 70s, viscoelastic effects were deemed to cause the reduced mobility of HPAM solutions at high rates in porous media (Pye 1964; Gogarty 1967; Marshall and Metzner 1967). Marshall and Metzner (1967) correlated the viscoelastic effects with a Deborah number. They reported that the viscoelastic effects become dominant in porous media when the Deborah number is in between 0.1 to 10. At higher flow rates, the Deborah number increases. Smith (1970) observed that the mobility of polymer solutions decreases significantly at higher flow rates. Smith claimed these viscoelastic effects at high rates might reduce the channeling in high permeable zone. Jennings et al. (1971) also reported the viscoelastic effects were prominent with high molecular weight polymers with flexible, linear chain structures. High rates are typically encountered around the wellbore where the injectivity is a major concern. Injectivity is a measurement of the ease with which the fluid can be injected into the reservoir (Hyne 1991). Excessive pressure generated during injection will result in the mechanical degradation and formation fracturing. Both degradation and unintended fracturing are undesirable. Polymer solutions exhibiting shear thinning will have higher injectivity. Viscoelastic polymers solutions exhibit thickening after a critical flow rate in the porous media (Seright et al. 2011; Delshad et al. 2008). Thickening causes an increase in the viscosity with respect to shear rate. However, in the bulk shear field, it exhibits shear thinning. Polymer solutions that exhibits shear thinning in the shear field will exhibit thickening in the extensional field (Barnes 2010). The Carreau model that predicts the pure viscous biopolymer behavior fairly well and underestimates the apparent viscosity of the viscoelastic polymers in the porous media by a considerable margin (Delshad et al. 2008; Magbagbeola 2008). Seright et al. (2009) studied the behavior of HPAM and biopolymer in porous media. Xanthan gum exhibits shear thinning behavior both in bulk shear field and in porous media. HPAM that exhibits shear thinning in bulk field, exhibited thickening in porous media. This was attributed to viscoelastic nature of HPAM. Predictions based on the Carreau model result in the overestimation of injectivity that may lead to undesirable consequences such as fracturing and mechanical degradation.

If the Carreau model is used by the oil companies for oil field polymer screening purpose, they will underestimate the apparent viscosity (and thus the injection pressure) and overestimate the injectivity. If they apply this in the field, it will generate unexpectedly high pressure that will fracture the reservoir. Fracturing the reservoirs will lead to the channeling of the injected polymer solutions from the injector to the producer without sweeping the oil. Thus, the whole purpose of EOR will be affected and the companies will end up losing the expense without profit.

Critical flow rate that results in the viscoelastic thickening may occur at relatively lower rate experienced in the reservoir for high molecular weight polymers (Delshad et al. 2008; Clarke et al. 2015). Viscoelastic effects may result in poor injectivity. However, it influences the oil recovery positively (Delshad et al. 2008; Clarke et al. 2015; Pengpeng et al. 2016). Therefore, predicting the onset is crucial for screening or formulating the polymers solutions that could give better recovery due to viscoelasticity. Onset is not observed in the Carreau model for viscoelastic polymers solutions (Delshad et al. 2008). Thus, viscoelasticity has an influence on the injectivity and recovery. Predicting the shear thickening regime and onset is crucial for screening the polymers for optimal injectivity and recovery. Attempts were made to quantify the viscoelastic effects since 1970s.

Hirasakhi and Pope (1974) developed the viscoelastic model as early as 4 decades ago. Modelling was done based on the postulation that flow through varying cross sectional pores is simply elongational. Extensional viscosity is related to the Deborah number and shear viscosity by the Equation 2.

$$\mu_{ext} = \frac{\mu_{shear}}{1-N_{Deb}} \quad \text{Equation (2)}$$

Where:
$\mu_{ext}$=Extensional viscosity, cP
$\mu_{shear}$=Shear viscosity, cP
$N_{Deb}$=Deborah number The physical meaning in the model (Equation 2) is lost when the Deborah number becomes above 1. Commonly used high molecular weight polymers exhibit a Deborah number much higher than 1 (Pengpeng Qi et al. 2016).

Chauveteau et al. (1982) observed the dilant behavior with viscoelastic polymer solutions in artificial porous media. Dilant behavior was attributed to the coil-stretch transition of polymer molecules in the elongational part of flow. Intense dilant behavior was observed when the stretch rate is higher.

Heemskerk et al. (1984) did detailed core flood studies to ascertain the viscoelastic onset. The authors quantified the viscoelastic effects through the critical flow rate causing the viscoelastic onsets and two power law coefficients representing thinning and thickening effects. Viscoelastic onsets decrease with increasing temperature, permeability and salinity and increases with increasing molecular weight, concentration. Parameters such as salinity and temperature degrade the polymers thereby making it less elastic that needs really high flow rate to induce the viscoelastic effects. With increasing permeability, the injected polymers is subjected to less deformation as the polymer are flowing through the pore spaces more freely and the high flow rate is needed to induce the deformation that leads to coil-stretch transition and viscoelastic effects. Increasing the concentration and molecular weight increases polymer elastic nature and thereby onset was early. The conducted studies provided a detailed sensitivity analysis of polymer and porous media properties on the viscoelastic effects. However, it could not be used for quick screening as it relied completely on core flooding.

Masuda et al. (1992) provided an improved version by accounting for the combination of elastic viscosity and viscous viscosity for the Darcy viscosity to account the viscoelastic effects. By accounting for the additional pressure drop, the Deborah number was interpreted as ratio of elastic force to viscous force. Shear viscosity was considered as the viscous force and he proposed the viscoelastic model of the form represented in Equation 3. The Equation is used for history matching the oil recovery.

$$\mu_{ext}=\mu_{shear}*C*N_{Deb}^{m_c} \quad \text{Equation (3):}$$

Where:
$\mu_{ext}$=Extensional viscosity, cP
$\mu_{shear}$=shear viscosity, cP
$N_{Deb}$=Deborah number
C=Empirical constant
$m_c$—Empirical constant Two limitations in the Masuda's model are that it depends on core flooding to determine the 'C' and '$m_c$', and also the relaxation time used in the Deborah number calculation. Another limitation is the elastic force in the elongational part increases indefinitely when the Deborah number increases.

Ranjbar et al. (1992) developed a model for accounting for the additional apparent viscosity caused by the strain flow of viscoelastic polymer solutions in the porous media. Apparent viscosity was treated as the sum of shear and strain (elongational) viscosity. The model is based on Maxwell-Fluid relation and it was found that the model index is an important parameter for viscoelastic quantification. Model index is determined by changes inducted to the polymer molecules before and after the reduction of injection rate and injection pressure. Model index increases with decreasing permeability and increasing storage modulus and concentration. This process of viscoelastic quantification requires extensive core flooding experiments.

Wang weiying (1994) proposed the model of the form given by Equation 4.

$$\mu_{eff}=(1+(B^**\gamma^{m_c}))*\mu_v \quad \text{Equation (4):}$$

Where:
B=Parameter related to the pore structure
$\gamma$=shear rate, $s^{-1}$
$m_c$=Slope determined from the experiments
$\mu_v$=shear viscosity, cP Garrouch (1999) reported the inadequacy of the Deborah number (calculated using oscillatory relaxation time) to distinguish the behavior of Xanthan gum and HPAM at high salinity. The elastic nature of HPAM is affected at high salinity that results in the comparable relaxation time with salinity tolerant, viscous xanthan gum. He introduced a new viscoelastic number that fairly distinguishes viscous xanthan gum and viscoelastic HPAM. The viscoelastic number represented by Equation 5 incorporates bulk oscillatory relaxation time and power law exponent.

$$N_v = \frac{\sqrt{k*\Phi}}{\theta_{f_1} * u^{n-1}} \quad \text{Equation (5)}$$

Where:
n=Power law exponent determined through core flood experiments.
$\theta_{f_1}$=Relaxation time, s Mu-Wenzhi (2005) also proposed the similar model that relates the apparent viscosity with relaxation time. It is given by Equation 6.

$$\mu_{eff} = (1 + (2*\theta_f*\gamma))*\mu_v \quad \text{Equation (6):}$$

Where:
$\mu_{eff}$=Effective viscosity in cP
$\theta_f$=Relaxation time in s
$\gamma$=Shear rate in s$^{-1}$
$\mu_v$=Shear viscosity in cP The limitation in this model is that effective viscosity increased monotonically with respect to the Deborah number. Delshad et al. (2008) identifies this limitation.

Yin-Hongjun (2006) also proposed the similar model, it is given by Equation 7.

$$\mu_{eff} = (1 + (B*D)*\mu_v \quad \text{Equation (7):}$$

Where:
$\mu_{eff}$ i=Effective viscosity, cP
B=Empirical parameter based on the rock and fluid properties. It is determined from the experiments.
D=Parameter combination of porous medium.

This model is also dependent on the core flooding experiments.

Delshad et al. (2008) developed the unified apparent viscosity model (UVM) based on postulation that the apparent viscosity of polymer solutions is the sum of shear and elongational viscosity. The UVM model accounts for the viscoelastic thickening in the extensional part through relaxation time ($\tau_r$), strain hardening index ($\eta_2$) and maximum elongational viscosity ($\mu_{max}$). The Deborah number is the product of the relaxation time and shear rate. The extensional part of the model (represented by Equation 8) is of the form:

$$\mu_{ext} = \mu_{max} * (1 - \exp(-(\beta * N_{Deb})^{n2-1}) \quad \text{Equation (8):}$$

Where:
$\mu_{max}$=Maximum empirical elongation viscosity
$N_{Deb}$=Deborah number which is the ratio of relaxation time to residential time
$n_2$=Strain hardening index
$\beta$=Universal constant The UVM model addresses the limitation of previous viscoelastic models. However, it is dependent on the core flood data to predict the extensional parameters such as maximum elongational viscosity and strain hardening index.

Kim et al. (2010) developed the empirical correlation using a generalized Maxwell model to determine relaxation time for various conditions of salinity; temperature etc. the relaxation time is used successfully in elongational dominated part of the UVM to predict the shear thickening. However, other extensional parameters such as maximum elongational viscosity and strain hardening index are obtained through core flood experiment.

Stavland et al. (2014) developed an extended viscoelastic model that could predict the 4 different viscosity regimes exhibited by viscoelastic polymers in porous media. The regimes are Newtonian, shear thinning, shear thickening and shear degradation. The Stavland model is given by the Equation 9.

$$n_{app} = n_\infty + [(n_o - n_\infty)*(1 + \lambda_1\gamma)^n + (\lambda_2\gamma)^m] * [1 + (\lambda_3\gamma)^x]^{\frac{j}{x}} \quad \text{Equation (9)}$$

Shear thinning index (n) and characteristic time ($\lambda_1$) needed for modeling the shear thinning regimes are determined through bulk shear rheology. Shear thickening is due to elongation of polymer molecules. ($\lambda_2$) is the relaxation time. m is the elongational exponent determined empirically through core flood data. Mechanical shear thinning exponent (x) and time constant ($\lambda_3$) are determined through effluent samples. ($\gamma$) is the shear rate and (j) is the tuning parameter. This model also requires core flood experiments to predict the shear thickening behavior of polymer solutions.

From these studies, it is clear that the polymer chain becomes stretched at large deformation that results in the eventual extensional flow. Large deformation occurs at high rates that are typically encountered around the wellbore. Reservoirs characterized by the low permeability also induce large deformation to the viscoelastic polymer solutions. In the extensional field, the flow is in the direction of the stress. Contrarily in shear field, the flow is in the direction perpendicular to applied stress. Extensional flow is the strong flow that causes the thickening of viscosity with respect to flow rate (Barnes 2010, Taha 2010). Polymer that thins in shear field thickens in the porous media and in bulk extensional field. All the summarized viscoelastic models accounted the additional pressure drop caused by the viscoelastic effects to the extensional viscosity empirically. This results in the requirement of core flooding experiments. The Carreau model that can predict the viscous biopolymer behavior in porous media underestimates the apparent viscosity of viscoelastic polymers. The Carreau model fails to predict the rate of viscoelastic onsets. While viscoelastic models such as UVM can predict the apparent viscosity in shear thickening regime, it requires core flooding experiments. Despite recognizing the extensional contribution to viscoelastic thickening, there was no effort being made to develop a universal model based on the direct extensional rheological measurements. Developing such model for viscoelastic polymers will get rid of core flood experiments and is the objective of this invention.

Unlike shear measurements, extensional measurements of the low viscous polymer slugs still remain the challenge. Extensional characterization methods such as tubeless siphon, spinning flow and bubble collapse cannot characterize the low viscous polymer solutions. The minimum zero shear viscosity of testing polymer solution should be above 0.1 Pa·s, 0.35 Pa·s and 60 Pa·s respectively (Schummer and Tebel 1983). However, viscoelastic polymer solutions used for EOR applications have been reported to exhibit zero shear viscosity of less than 0.04 Pa·s (Seright et al. 2009). Extensional characterization of low viscous fluids was done by opposed jet rheometer (Fuller et al. 1987); optimal detection of birefringence through four roller apparatus (Harrison et al. 1999) and uniaxial systems replicating the porous media (Maguer et al. 1984). The time factor and complexity is an issue with all these methods (Plog et al. 2005). Further deformation experienced by the polymer solution in all these techniques is not purely elongational (Schummer and Tebel 1982; Martischius 1982; Bhardwaj et al. 2007). The extensional interpretation based on such mixed flow (shear and elongational) will be erroneous. Capillary break up extensional rheometry (CaBER) and filament stretching extensional rheometry (FISER) methods can characterize the properties of the polymeric fluids in the uniaxial elongational flow (Anna and McKinley 2001; Plog et al. 2005; Clasen et al. 2006; Bhardwaj et al. 2007). However, FISER methods are not capable of characterizing polymer solutions possessing zero shear viscosity above 0.5 Pa·s (Mckinley and Sridar 2002; Clasen et al. 2006). CaBER on the other hand was reported to handle much low viscous fluid with zero shear viscosity between from 0.002-0.01 Pa·s (Rodd et al. 2005). CaBER is used in this research for extensional characterization.

SUMMARY OF THE INVENTION

The present invention provides an improved method of recovering oil from a depleted oil reservoir wherein the oil is embedded in an underground matrix adjacent the depleted oil reservoir. The method includes injecting a mixture of polymeric material into the depleted oil reservoir through an injection borehole, applying a pressure to the mixture to free the oil from the matrix and move the oil towards a production well, and drawing the oil from the depleted oil reservoir through the production well. The improvement including modeling a shear thickening of the polymeric mixture and an onset of the shear thickening according to:

$$\mu_{app} = \mu_\infty + (\mu_p^o - \mu_\infty)[1 + (\lambda * \gamma)^\alpha]^{\frac{(n-1)}{\alpha}} + \mu_{max,De_{cr-0.66}}^{0.35}[1 - \exp(-(\beta * \tau_{ext} * \gamma)^{n_2 - 1.2 - 1})]$$

where:
- $\mu_{app}$=Apparent viscosity, Pa·s;
- $\mu_\infty$=Upper Newtonian viscosity, Pa·s;
- $\mu_p^o$=Lower Newtonian viscosity, Pa·s;
- $\lambda$=Characteristic relaxation time, s;
- $\gamma$=Shear rate, /s;
- n=Shear thinning index;
- $\alpha$=Constant equal to 2;
- $\mu_{max,De_{cr-0.66}}$=Maximum empirical elongation viscosity at the critical Deborah number of 0.66;
- $n_2$=Strain hardening index;
- $\beta$=Universal constant equal to 0.01; and
- $\beta_{ext}$=Extensional relaxation time, s.

The model of the present disclosure can be incorporated into commercial numerical simulators for predicting the injectivity and recovery due to viscoelastic thickening independently and thereby assist in quick screening polymers for oil recovery applications.

BRIEF DESCRIPTION OF THE DRAWINGS

The present invention is further detailed with respect to the following drawings that are intended to show certain aspects of the present of invention, but should not be construed as limit on the practice of the invention, wherein.

DETAILED DESCRIPTION OF THE INVENTION

Figure 1:
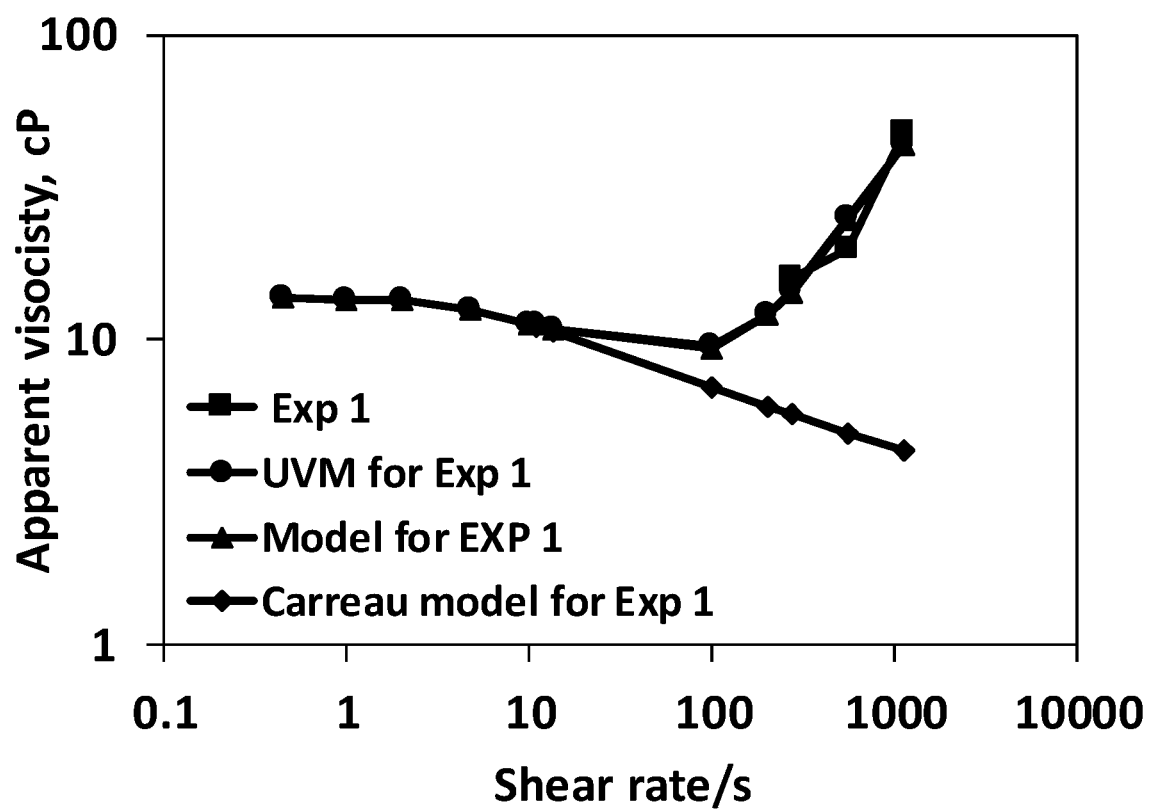
FIG. 1 is a graph showing apparent viscosity versus shear rate for Data Set 1 listed in Table 2.

The present invention has utility as an improved method of recovering oil from a depleted oil reservoir, and more specifically as an improved method of recovering oil from a depleted oil reservoir that includes modeling a shear thickening of the polymeric mixture and an onset of the shear thickening to accurately predict the flow of the polymeric mixture.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

High molecular weight, flexible polymers used for heavy oil recovery exhibit viscoelasticity that causes the thickening of apparent viscosity which could not be predicted by the conventional shear thinning rheological models. The unified apparent viscosity model (UVM) developed at UT-Austin based on the postulation that the apparent viscosity of polymer solutions is sum of shear and elongational viscosity accounts for the viscoelastic thickening in the extensional part through relaxation time ($\tau_{ext}$), maximum elongational viscosity ($\mu_{max}$) and strain hardening index ($n_2$). Although UVM addresses the other limitation of the previous viscoelastic models, its dependence on the core flood data to predict $\mu_{max}$ and $n_2$ limits its commercial independent usage for preliminary screening.

These limitations are addressed in viscoelastic model of the present disclosure, which predicts the apparent viscosity in the thickening region using the extensional parameters measured by capillary breakup extensional rheometer (CaBER) through the combination of upper convected Maxwell (UCM), finite extensible nonlinear elasticity (FENE) and power law theories. CaBER set up uses a step-strain to stretch the drop of polymeric liquid placed between the two plates and monitor its midpoint diameter during filament drainage. $\tau_{ext.}$ is determined by fitting the filament diameter from the region representing the balance between the elastic stress and surface tension into UCM. As per FENE theory, fluid relaxes at the rate two third of its strain rate and the extensional viscosity around the critical Deborah number of 0.66 corresponds to the maximum elastic limit and would be $\mu_{max}$. Filament during drainage gets strained and the corresponding increment in extensional viscosity is fitted with power law to determine the $n_2$.

A series of core flood data (performed using partially hydrolyzed polyacrylamide (HPAM) polymers) from the UT-Austin thesis that validated the UVM model are used extensively. Other reported literatures data are also used. Extensional rheology is performed on those polymers at the similar conditions to determine the $\tau_{ext.}$, $\mu_{max}$ & $n_2$. These parameters along with the shear parameters are used to match the reported apparent viscosity. All the experiments fairly match well with the average downscaling power factor of 0.35 to $\mu_{max}$ and subtrahend of 1.2 to $n_2$. Downscaling and subtrahend factor are essential to scale down the pure elongation in the extensional bulk field to the combination of shear and elongation experienced in the porous media.

The model of the present disclosure can be incorporated into commercial numerical simulators for predicting the injectivity and recovery due to viscoelastic thickening independently and thereby assist in quick screening polymers for oil recovery applications.

The present disclosure provides a method for determining the onset, apparent viscosity, and the shear thickening regime through measurable extensional parameters. Extensional parameters include the $\mu_{max}$ (maximum elongational viscosity), $n_2$ (strain hardening index) and $\tau_{ext}$ (extensional relaxation time). These parameters are determined from filament drainage experiments performed using CaBER based on the upper convected Maxwell (UCM) model, finite extensible non-linear elastic (FENE) theory and power law model. The proposed model is validated by matching the 14 core flood experiments reported in the literature. Average downscaling power factor to maximum elongational viscosity and subtrahend to strain hardening index are used for scaling down from the pure elongation in bulk extensional field to the combination of shear and extensional in the porous media. The accuracy of the prediction by the model of the present disclosure is compared with both the UVM (core flood-dependent) and Carreau model (core flood Independent) models.

METHODOLOGY

The steps involved in the development of model are listed below.
1. Shear thickening data exhibited by viscoelastic polymer solutions in porous media are extracted from the different literatures.
2. Extensional measurements are done with CaBER at the similar conditions
3. Maximum elongational viscosity, strain hardening index and extensional relaxation time are the extensional parameters used by UVM model to predict the shear thickening regimes.
4. Extensional parameters mentioned in the UVM model are attained using the CaBER theories.
5. Attained extensional parameters using CaBER theories are coupled into the UVM model.
6. Downscaling factor needed for bringing the pure elongation in the extensional field to combination of shear and elongation in porous media is determined
7. Modified model incorporating measured extensional parameters could predict the shear thickening exhibited by the viscoelastic polymers without core flood data.
8. The capability of the proposed model to predict the onsets, shear thickening regimes are compared with UVM model and carreau model UVM model: Unified apparent viscosity model represented by Equation. 10 is the sum of shear (Equation. 1) and extensional viscosity (Equation. 8) (Delshad et al. 2008).

$$\mu_{app} = \mu_\infty + (\mu_p^o - \mu_\infty)[1 + (\lambda * \gamma)^\alpha]^{\frac{(n-1)}{\alpha}} + \mu_{max} * [1 - \exp(-(\beta * N_{Deb}))]^{n_2 - 1}$$

Equation (10)

Where shear parameters such as $\mu_\infty$, $\mu_p^o$, $\lambda$, $\alpha$ and n are determined through bulk shear rheology using carreau model. Extensional parameters such as $\mu_{max}$ and $n_2$ are determined through core flooding. Relaxation time used for Deborah number calculation is determined through oscillatory rheology.

CaBER theories: In the CaBER experiment, pure extensional flow is generated by stretching the polymer samples. Filament drainage induced by the imposed step strain is governed by the balance between the driving capillary force and the resistive viscous and elastic force. Following the viscous dominated fluid drainage in the early phase, the intermediate time scale of viscoelastic fluids that has been reported to be governed by the balance between elasticity and surface tension is represented by the exponential decline in filament diameter (Entov and Hinch 1997). The filament drainage (filament diameter decline with time) has parameters that can be decoded using appropriate theories to get the maximum elongational viscosify, relaxation time and strain hardening index CaBER experimental procedure: Each of the polymer samples to be measured are taken in a small quantity and are positioned carefully in between the two circular plates of diameter 6 mm. The top plate is rapidly separated from the bottom plate, thereby forming a filament by imposing an instantaneous level of extensional strain on the fluid sample. A strike time of 50 ms is given for the separation of plates. After stretching, the fluid is squeezed together by capillary force. A laser micrometer monitors the midpoint diameter of the thinning fluid filament as a function of time. The relevant extensional parameters ($\tau_{ext}$, $\mu_{max}$, $n_2$) of the polymers are then quantified using CaBER theories. The experimental conditions are reported in Table 1.

TABLE 1

Test conditions during extensional rheology

| Parameters | Values |
| --- | --- |
| Initial gap distance | 3 mm |
| Final gap distance | 8.2 mm |
| Final aspect ratio | 2.73 |

UCM model for relaxation time: The upper-convected Maxwell model is used to estimate the extensional relaxation time by regression. The linear data representing the elastic region is extracted from the filament diameter versus time semi-logarithmic plot for the two polymer samples and then fitted with the upper-convected Maxwell model using regression to match the exponential decline of fluid diameter as given in Equation. 11. The extensional relaxation time is determined using the match. The value of 73 milli N/m is used for the surface tension all the solutions.

$$D_{mid}(t) = D_o \left( \frac{G * D_o}{4 * \sigma} \right)^{\frac{1}{3}} e^{\left( \frac{-t}{3 * \tau_{ext}} \right)} \quad \text{Equation (11)}$$

Where:

$D_{mid}(t)$=mid-point diameter, mm
$D_o$=initial diameter of sample, mm
G=Elastic modulus, Pa
$\tau_{ext}$=Extensional relaxation time, s FENE theory for maximum elongational viscosity: The filament drainage in CaBER is driven by the capillary force and resisted by the viscous and elastic force. The axial force balance detailed in Anna and McKinley (2001), McKinley (2005) and used recently by Kim et al. (2010) is given by Equation. 12.

$$\frac{2\sigma}{D_{mid}} = 3\eta_\varepsilon \dot{\varepsilon} + (\tau_{zz} - \tau_{rr}) \quad \text{Equation (12)}$$

The strain and strain rate is calculated using the Equations 13 and 14.

$$\varepsilon(t) = 2\ln\left( \frac{D_o}{D_{mid(t)}} \right) \quad \text{Equation (13)}$$

$$\dot{\varepsilon}(t) = \frac{-2}{D_{mid(t)}} \left( \frac{dD_{mid(t)}}{dt} \right) \quad \text{Equation (14)}$$

The elongational viscosity can be calculated by substituting Equation 14 into Equation 12. Since the filament flow is purely elongational, the stresses resisting the capillary action are extensional and viscosity calculated out of them represents the extensional viscosity. The details of these derivations can be found elsewhere (Anna and Mckinley 2001; Kim et al. 2010). The elongational viscosity is represented by Equation 15.

$$\eta_{app}(e) = -\frac{(2x-1)\sigma}{\frac{dD_{mid}}{dt}} \quad \text{Equation (15)}$$

Where:
η=Newtonian viscosity, Pa·s
$\tau_{zz} - \tau_{rr}$=Normal stress difference
ε(t)=Strain
$\dot{\varepsilon}$(t)=Strain rate, s$^{-1}$
$D_{mid}$(t)=Mid-point diameter, mm
$\eta_{app}$(e)=Apparent extensional viscosity, Pa·s
X=Correction factor for axial variation–0.7127

$$\sigma = \text{Surface tension, 73 milli} \frac{N}{m}$$

During filament drainage, Entov and Hinch (1997) derived that fluid relaxes at the rate $\frac{2}{3}^{rd}$ of strain rate using FENE theory. The details of the derivation can be found in the Entov and Hinch (1997). Filament drainage is constant at the critical Deborah number of 0.66 and it represents the maximum elastic limit where the elongational viscosity tends to be higher (Kim et al. 2010). This will be used as $\mu_{max,De_{C_t-0.66}}$ in the proposed model. The Deborah number is the product of relaxation time and shear rate. Relaxation time is determined through the UCM model. Critical strain rate is determined by dividing the critical Deborah number by the relaxation time.

Power law theory for strain hardening index: During filament drainage, the fluids get strained that results in the increase of apparent viscosity with respect to shear rate contrary to shear thinning that occurs in the shear field. The viscoelastic polymer exhibits hardening behavior in extensional field and thinning in the shear field (Barnes 2010). During filament drainage, the polymers tend to show an increase in the extensional viscosity with respect to strain. Extensional viscosity vs strain is fitted with the power law to calculate the average strain hardening index.

Coupling with UVM model: 14 different core flood experiments that have a shear thickening regime are chosen. The properties and operational conditions are reported in the Table 2. Extensional rheology is done with the polymer at the operational conditions mentioned in the Table 2. Extensional parameters are determined using the CaBER theories.

TABLE 2

Conditions pertinent to the extracted data from the literatures

| Data Sets | Polymers | References | Concentration | Salinity and Temperature | Permeability and Porosity |
|---|---|---|---|---|---|
| 1 | HPAM 3630 | Magbagbeola 2008 | 1500 ppm | 20040 ppm 23° C. | 647 mD and 0.23 |
| 2 | HENGFLOC 63020 | Magbagbeola 2008 | 1500 ppm | 20040 ppm, 23° C. | 552 mD and 0.23 |
| 3 | HENGFLOC 63020 | Magbagbeola 2008 | 1500 ppm | 20040 ppm, 23° C. | 372 mD and 0.23 |
| 4 | HENGFLOC 63026 | Magbagbeola 2008 | 1500 ppm | 20040 ppm, 23° C. | 260 mD and 0.22 |
| 5 | Pusher 700 | Yuan 1982 | 1000 ppm | 1000 ppm Room temperature | 4.2 D |
| 6 | Pusher 700 | Yuan 1982 | 1000 ppm | 1000 ppm Room temperature | 3.6 D |
| 7 | Pusher 700 | Yuan 1982 | 1000 ppm | 1000 ppm Room temperature | 37 D |
| 8 | HPAM 3630 | Mansor et al. 2014 | 850 ppm | 20000 ppm 30° C. | 647 mD 0.23 |

TABLE 2-continued

Conditions pertinent to the extracted data from the literatures

| Data Sets | Polymers | References | Concentration | Salinity and Temperature | Permeability and Porosity |
|---|---|---|---|---|---|
| 9 | HPAM 3630 | Mansor et al. 2014 | 850 ppm | 10000 ppm 30° C. | 647 mD 0.23 |
| 10 | HPAM 3630 | Mansor et al. 2014 | 600 ppm | 10000 ppm 30° C. | 647 mD 0.23 |
| 11 | HPAM 3230 | Seright et al. 2011 | 2500 ppm | 25200 ppm 25° C. | 5 D 0.35 |
| 12 | HPAM 3530 | Masuda et al. 1992 | 200 ppm | 0 ppm Room temperature | 20 D, 0.35 |
| 13 | HPAM 3630 | Laoroongroj et al. 2014 | 500 ppm | 21800 ppm 30° C. | 200 mD 0.23 |
| 14 | HPAM 3630 | Laoroongroj et al. 2014 | 500 ppm | 21800 ppm 30° C. | 2000 mD 0.23 |

Determination of average downscaling factors: Modified UVM model incorporating the measured extensional parameters are used to match the experimental values using non-linear regression. The average factor needed to bring the pure elongation to the combination of shear and elongation is determined. Extensional viscosity of viscoelastic polymers in 100% extensional field are more than 3 orders higher than shear viscosity. Thus, average downscaling power factor is determined to downscale the maximum elongational viscosity attained at the critical Deborah number in the extensional field to the combination of shear and extensional field in the porous media. Index determined through power law indicates the degree of thickening or thinning exhibited by the polymer solutions. The polymer that thins in the bulk shear field thickens in the bulk extensional field (Barnes 2010) and in porous media (Seright et al. 2011; Delshad et al. 2008). However, the degree of thickening in the porous media is less than the degree of thickening in the pure extensional field. Thus, subtrahend is determined to bring the strain hardening index measured using power law fitting in extensional field to the combination of shear and extension experienced in the porous media. Universal constant of 0.01 used along with Deborah number in UVM model is maintained in this model. Deborah number incorporating the shear rate controls the differences in the apparent viscosity caused due to the permeability.

Results

All the measured extensional and shear parameters are reported in the Table 3. Average downscaling power factor attained from these 14 data sets using non-linear regression is 0.35 and the average subtrahend is 1.2. The proposed viscoelastic model incorporating the direct extensional measurements is given by the Equation 16.

$$\mu_{app} = \mu_\infty + (\mu_p^o - \mu_\infty)[1 + (\lambda*\gamma)^\alpha]^{\frac{(n-1)}{\alpha}} + \mu_{max, De_{Cr-0.66}}^{0.35}[1 - \exp(-(\beta*\tau_{ext}*\gamma)^{n2-1.2-1})]$$

Equation (16)

Figure 2:
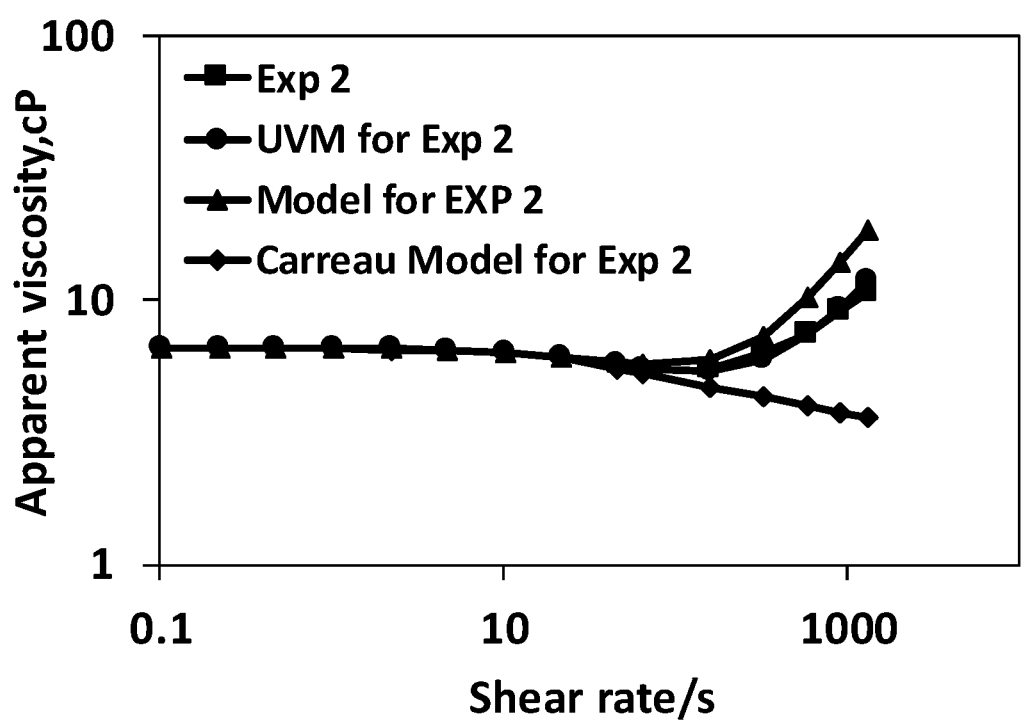
FIG. 2 is a graph showing apparent viscosity versus shear rate for Data Set 2 listed in Table 2.
Figure 3:
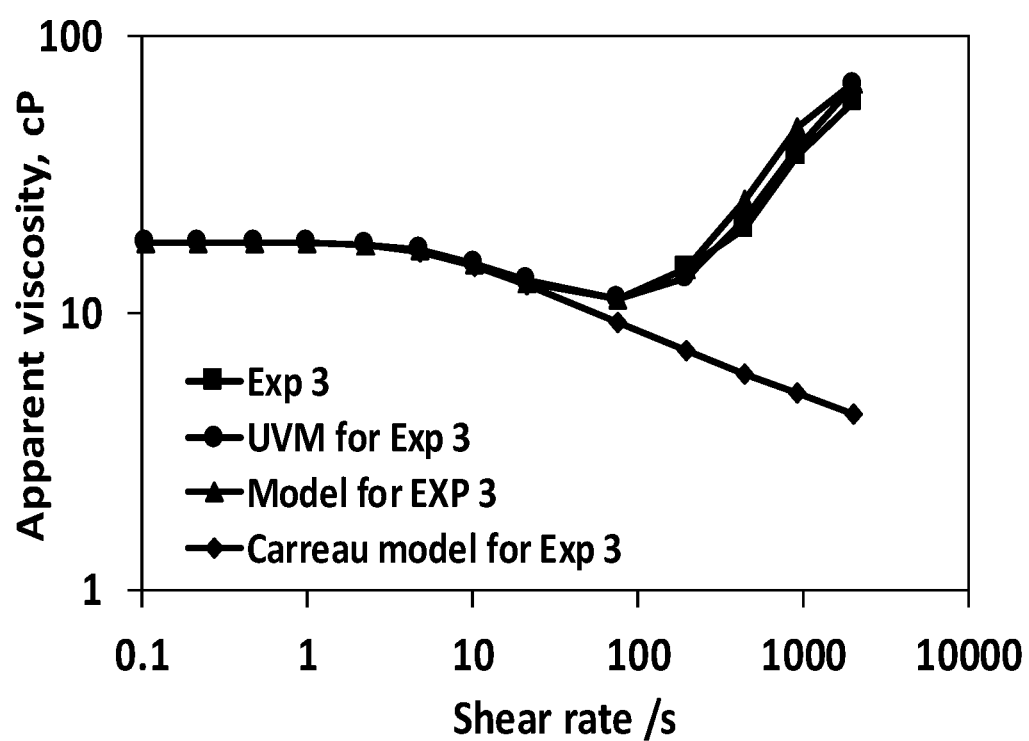
FIG. 3 is a graph showing apparent viscosity versus shear rate for Data Set 3 listed in Table 2.
Figure 4:
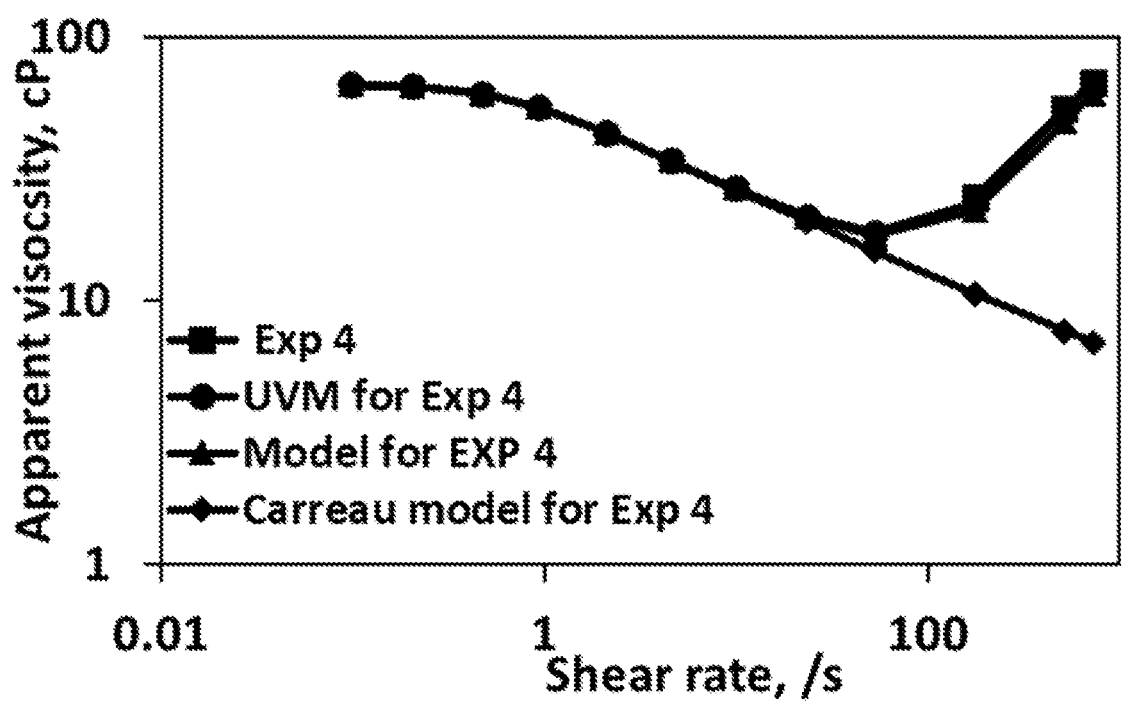
FIG. 4 is a graph showing apparent viscosity versus shear rate for Data Set 4 listed in Table 2.
Figure 5:
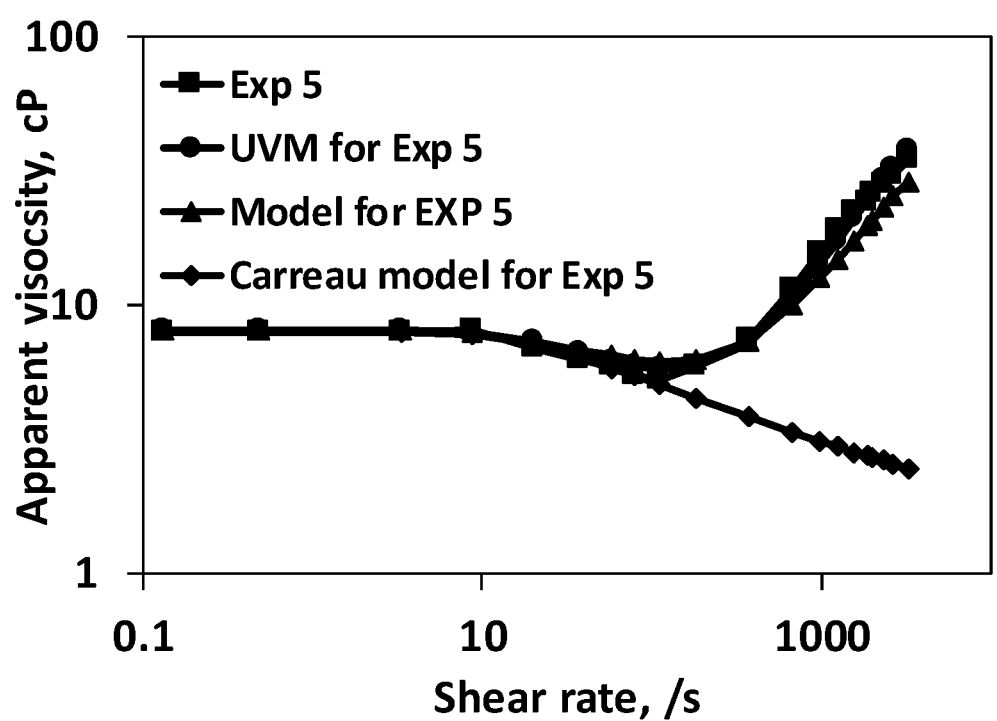
FIG. 5 is a graph showing apparent viscosity versus shear rate for Data Set 5 listed in Table 2.
Figure 6:
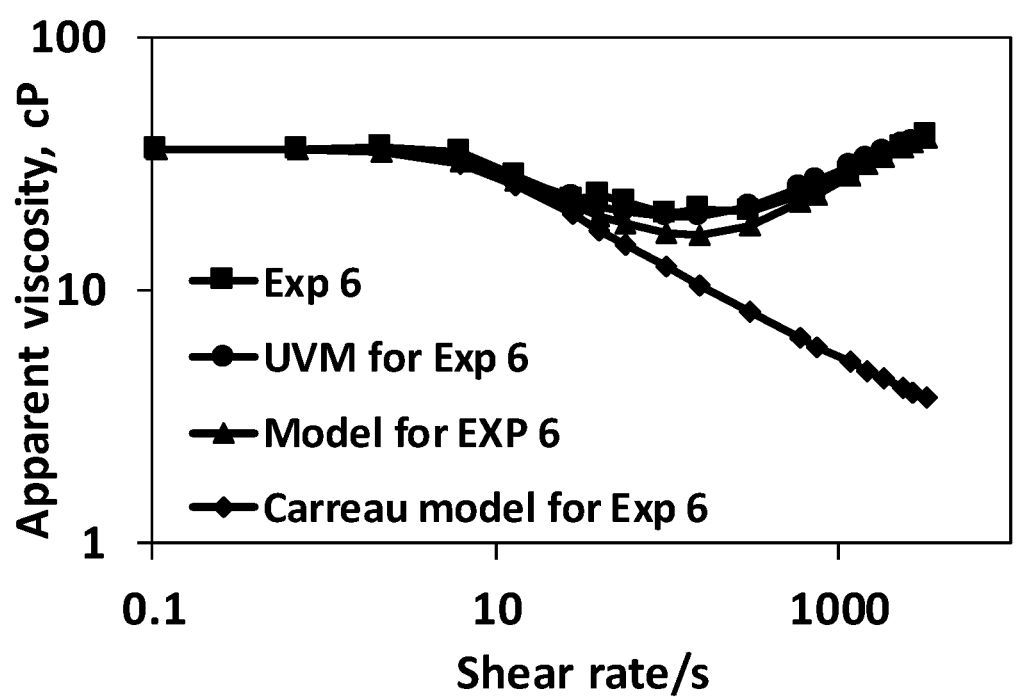
FIG. 6 is a graph showing apparent viscosity versus shear rate for Data Set 6 listed in Table 2.
Figure 7:
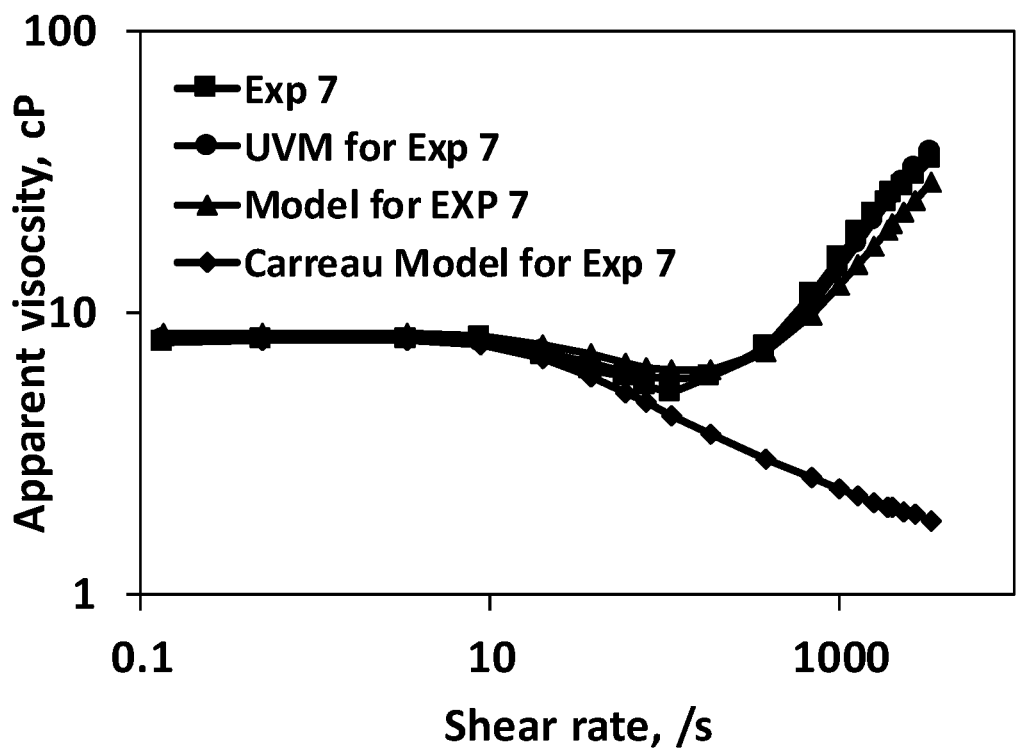
FIG. 7 is a graph showing apparent viscosity versus shear rate for Data Set 7 listed in Table 2.
Figure 8:
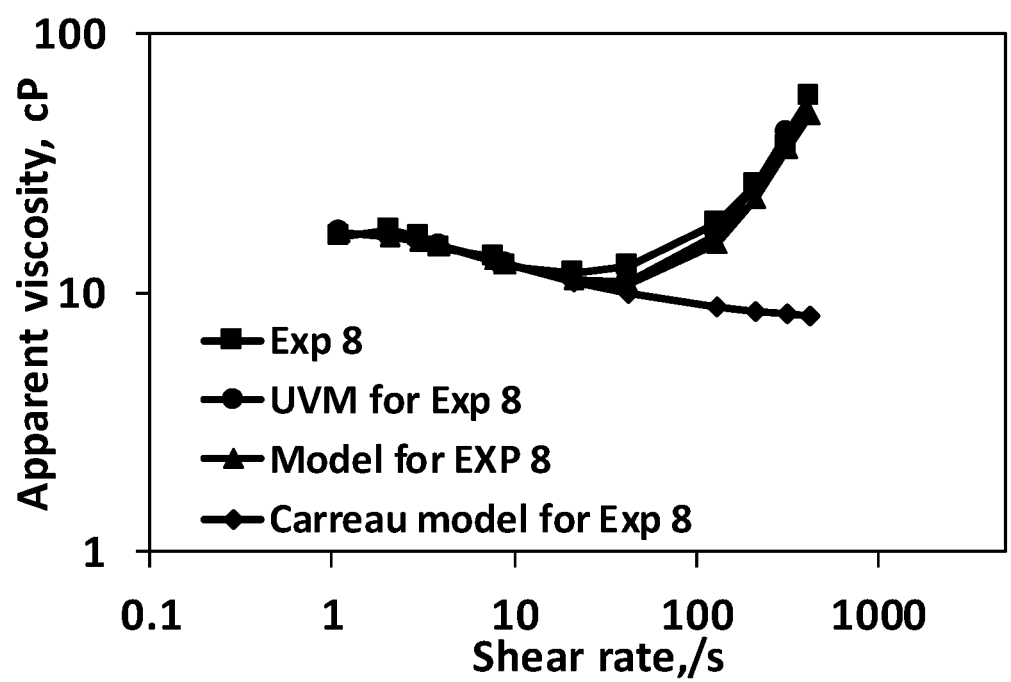
FIG. 8 is a graph showing apparent viscosity versus shear rate for Data Set 8 listed in Table 2.
Figure 9:
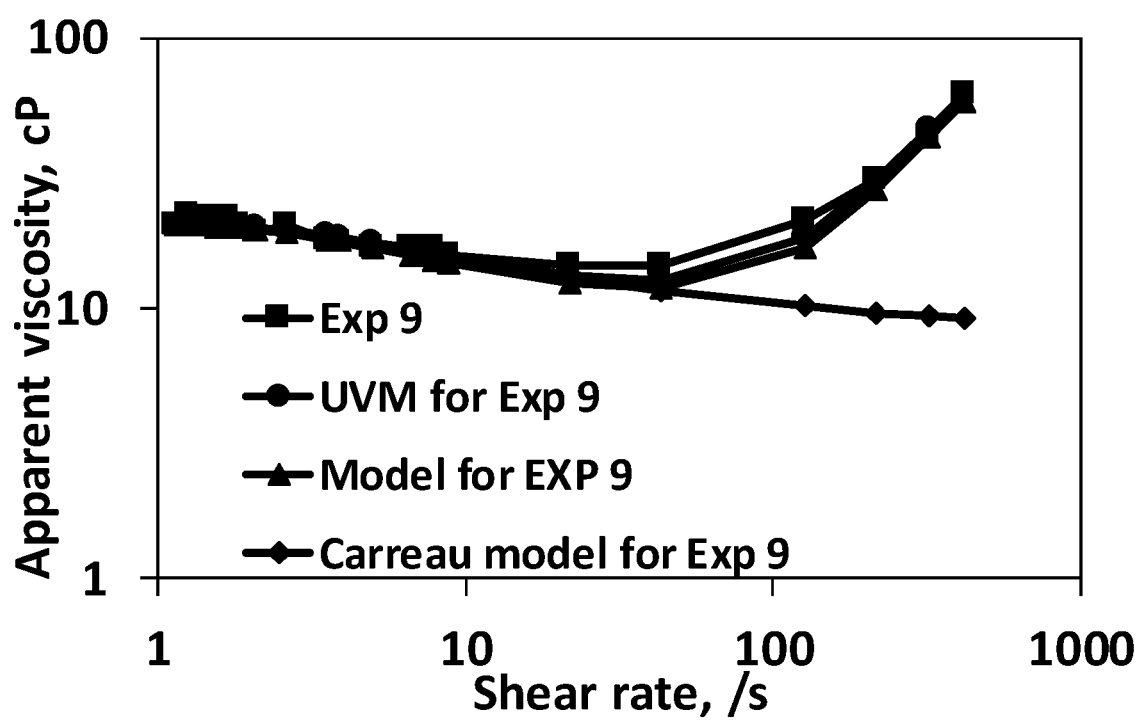
FIG. 9 is a graph showing apparent viscosity versus shear rate for Data Set 9 listed in Table 2.
Figure 10:
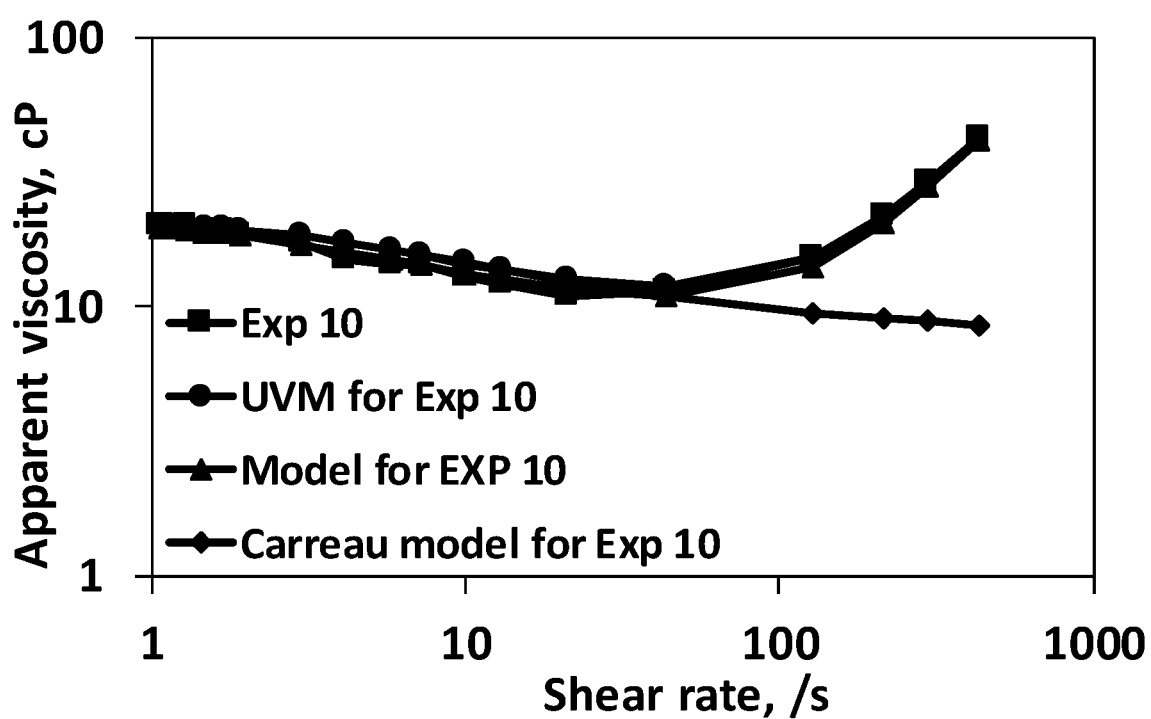
FIG. 10 is a graph showing apparent viscosity versus shear rate for Data Set 10 listed in Table 2.
Figure 11:
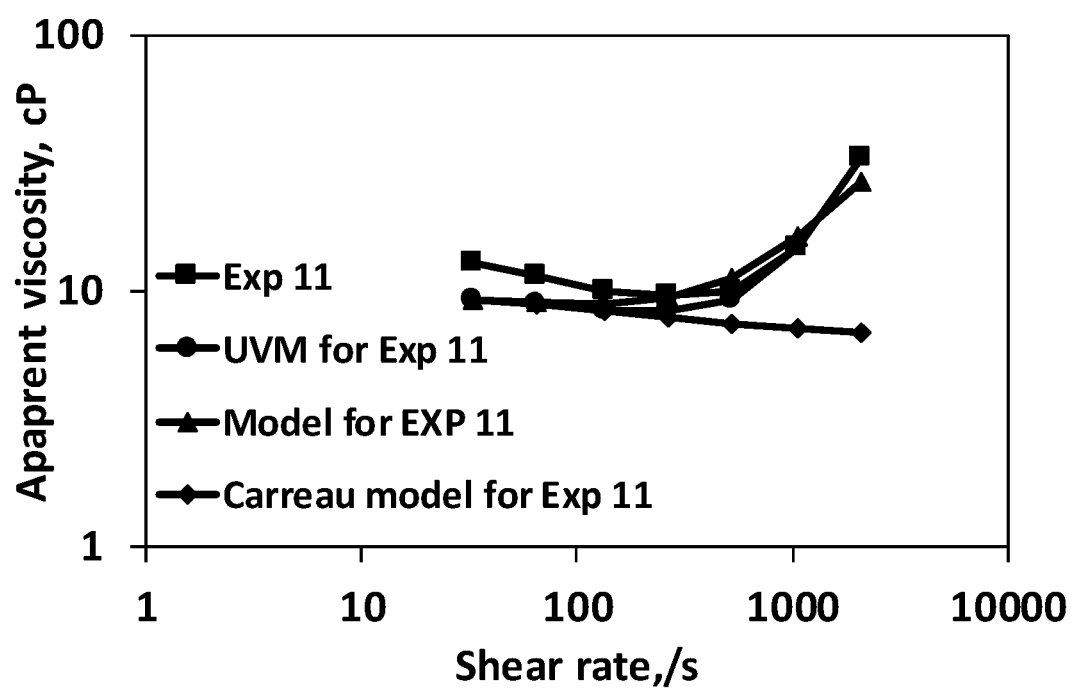
FIG. 11 is a graph showing apparent viscosity versus shear rate for Data Set 11 listed in Table 2.
Figure 12:
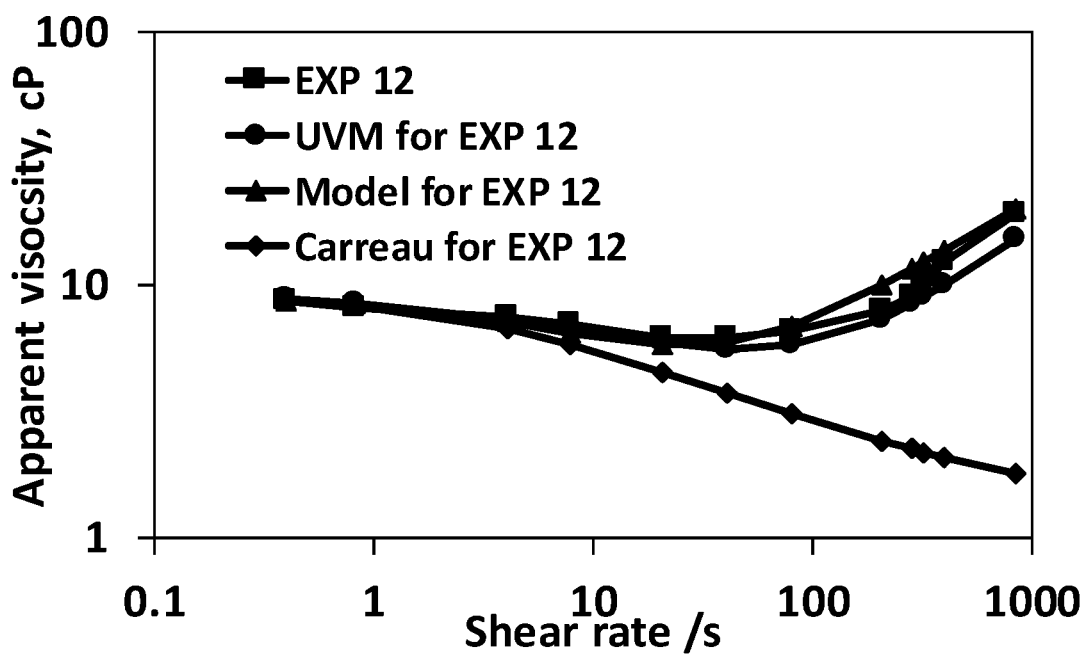
FIG. 12 is a graph showing apparent viscosity versus shear rate for Data Set 12 listed in Table 2.
Figure 13:
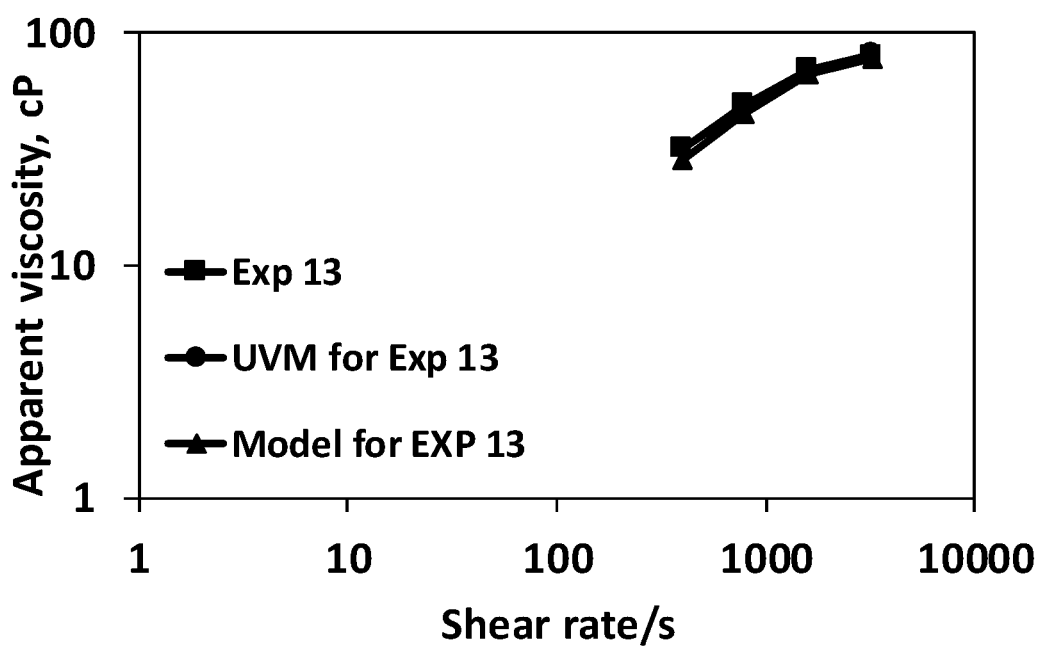
FIG. 13 is a graph showing apparent viscosity versus shear rate for Data Set 13 listed in Table 2.
Figure 14:
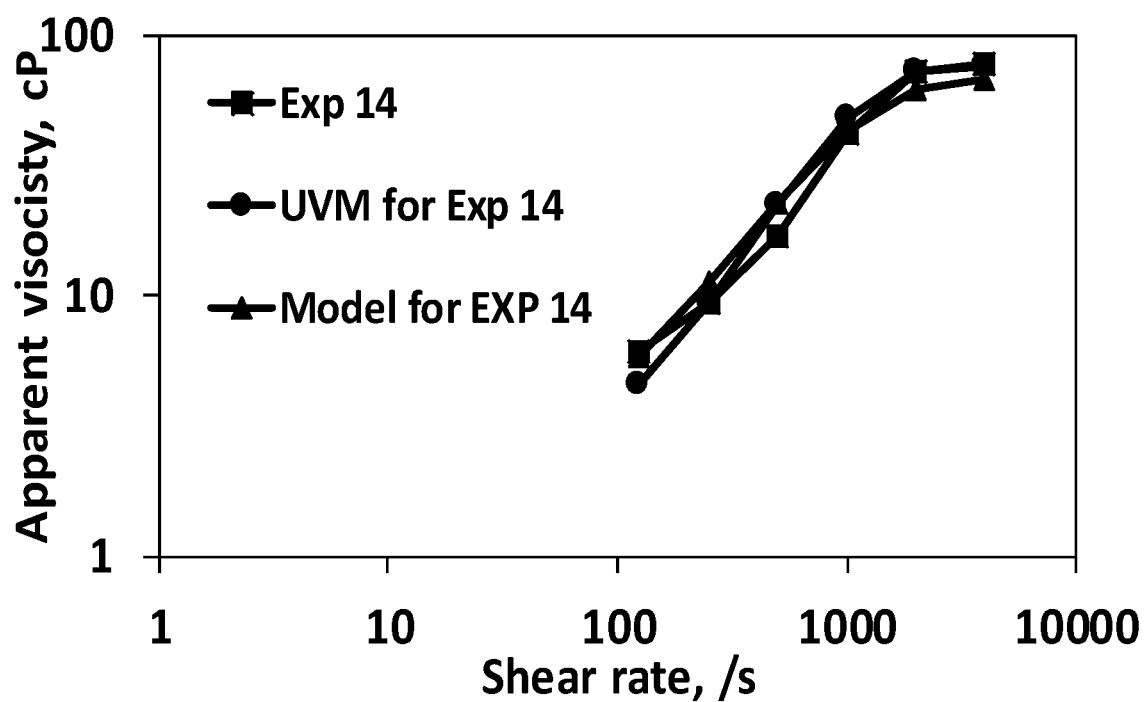
FIG. 14 is a graph showing apparent viscosity versus shear rate for Data Set 14 listed in Table 2.

Predictability of the proposed model to match the experimental data is shown in the FIGS. 1 to 14. The results presented in these Figures are compared with UVM model and Carreau model.

TABLE 3

Measured Extensional Parameters

| Data set | $\tau_{ext}$ (s) | $\mu_{max, De_{Cr-0.66}}$ | $n_2$ | n |
|---|---|---|---|---|
| 1 | 0.086 | 147000 | 3.520 | 0.755 |
| 2 | 0.048 | 26000 | 3.484 | 0.828 |
| 3 | 0.107 | 165000 | 3.586 | 0.72 |
| 4 | 0.146 | 285000 | 3.597 | 0.662 |
| 5 | 0.032 | 37000 | 3.372 | 0.75 |
| 6 | 0.0623 | 48000 | 3.029 | 0.6 |
| 7 | 0.032 | 37000 | 3.372 | 0.72 |
| 8 | 0.198 | 250000 | 3.975 | 0.49 |
| 9 | 0.216 | 340000 | 4.09 | 0.42 |
| 10 | 0.169 | 220000 | 3.948 | 0.5 |
| 11 | 0.0371 | 37000 | 3.602 | 0.7 |
| 12 | 0.073 | 30000 | 2.989 | 0.58 |
| 13 | 0.097 | 160000 | 3.531 | 0.483 |
| 14 | 0.097 | 160000 | 3.531 | 0.483 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

NOMENCLATURE

AP—Alkali polymer flooding
ASP—Alkali surfactant polymer flooding
CaBER—Capillary break up extensional rheometry
cP—centi Poise
EOR—Enhanced oil recovery
FENE—Finitely extensible non-linear elastic model
HPAM—Hydrolyzed polyacrylamide
SP—Surfactant polymer flooding
Pa·s—Pascal seconds
UCM—Upper convected Maxwell model
UVM—Unified apparent viscosity model

CITED REFERENCES

1. Anna, S. L. and McKinley, G. H. 2001. Elasto-capillary thinning and breakup of model elastic liquids. *J. Rheol.* 45(1): 115-138.
2. Azad, M. S. and Sultan, A. S. 2014. Extending the applicability of chemical EOR to high temperature, high salinity and fractured formation through viscoelastic surfactants. SPE 172188 presented at SPE Saudi Arabian Section Technical Symposium and Exhibition, 21-24 April
3. Barnes, H. A 2010. A Handbook of Elementary Rheology. Cambrian Printers, Llanbadarn Road, Abersysywyth SY23 3TN
4. Bhardwaj, A., Richter, D., Chellamuthu, M. et al. 2007. The Effect of Pre shear on the extensional rheology of wormlike micelles. *Rheol. Acta.* 46 (06): 861-875.
5. Cannela, W. J., Huh, C., and Seright, R. S. 1988 "Prediction of Xanthan Rheology in Porous Media" Presented at the SPE Annual Technical Conference and Exhibition, Texas, 2-5 October October. SPE 18089-MS.
6. Chauveteau. G. 1981. Molecular interpretation of several different properties of flow of coiled polymer solutions through porous media I oil recovery conditions, SPE 10060 presented at SPE Annual Technical Conference and Exhibition, 4-7 October, San Antonio, Tex., USA
7. Clarke. A., Howe. A. M., Mitchell, J. et al. 2015. How Viscoelastic Polymer flooding Enhanced Displacement Efficiency. *SPE J.* 21 (3): 675-687. SPE 174654-PA.
8. Clasen, C., Plog, J. P., Kullicke, W. M. et al. 2006. How dilute are dilute solutions in extensional flows? *J. Rheol.* 50(6): 849-881.
9. Delshad, M., Kim, D. H., Magbagbeola, O. A. et al. 2008. Mechanistic Interpretation and Utilization of Viscoelastic Behaviour of Polymer Solutions for Improved Polymer-Flood Efficiency. Presented at SPE Improved Oil Recovery Symposium, Tulsa, 24-28 April. SPE 113620-MS.
10. Entov, V. M. and Hinch, E. J. 1997. Effect of a spectrum of relaxation times on the capillary thinning of a filament of elastic liquid. *J. Non-Newtonian Fluid Mech.* 72(1): 31-53.
11. Fuller, G. G., Cathey, C. A., Hubbard, B. et al. 1987. Extensional viscosity measurements of low-viscosity fluids. *J. Rheol.* 31: 235-249.
12. Garrouch, A. A., 1999. A Viscoelastic Model for Polymer flow in the Reservoir rocks. SPE 54379 presented at the SPE Asia Pacific Oil and Gas Conference and Exhibition, Jakarta, Indonesia, 20-22 April.
13. Gogarty, W. B., 1967. Mobility control with Polymer solutions. *SPE J.* 7(02): 161-173. SPE 1566-B.
14. Green, D. W.; Willhite, G. P. *Enhanced Oil Recovery*, SPE Text book series: Texas. 1998; pp 73-100.
15. Han, M., Xianmin, Z., Al-Hasan, B. F. et al. 2012. Laboratory investigation of the injectivity of sulfonated polymer solutions into the carbonate reservoir rocks. Presented at SPE EOR conference, Muscat, 16-18 April. SPE 155390-MS.
16. Harrison, G. M., Remmelgas, J. and Leal, L. G. 1999. Comparison of dumbbell based theory and experiment for a dilute polymer solution in a co rotating two-roll mill. *J. Rheol.* 43 (1): 197.
17. Heemskerk, J., Rosmalen, R., Janssen-Van, R. et al. 1984. Quantification of Viscoelastic effects of Polyacrylamide Solutions. Presented at SPE Enhanced Oil Recovery Symposium, Tulsa, 15-18 Apr. 1984. SPE 12652-MS.
18. Hirasakhi, G. J and Pope, G. A. 1974. Analysis of Factors Influencing Polymer Mobility and Adsorption in the Flow of Polymer Solution through Porous Media. *SPE J.* 14(4): 337-346. SPE 4026-PA.
19. Hyne 1991 "Dictionary of Petroleum exploration, production and drilling" Penn Publication, Tulsa, USA
20. Jennings, R. R., J. H. Rogers and J. T. West, *Factors influencing mobility control by polymer solutions.* J. Petro. Tech., 23(1971), 391-401
21. Kim, N. J., Pipe, C. J., Ahn, K. H. et al. 2010. Capillary breakup extensional rheometry of a wormlike micellar solution. *Kor-Aust. Rheol. J.* 22 (01): 31.
22. Kim, D. H., Lee, S., Ahn, H. et al. 2010. Development of a viscoelastic property database for EOR polymers, SPE 129971 presented at the 2010 Improved Oil Recovery Symposium, 24-28 April, Tulsa, Okla.
23. Laoroongroj, A., Gumpenberger, T. and Clemens, T. 2014. Polymer flood Incremental Oil recovery and Efficiency in Layered Reservoir including Non-Newtonian and Viscoelastic effects: SPE 170657 presented at SPE Annual Technical Conference and Exhibition, Amsterdam. 27-29 October.
24. Magbagbeola, O. A., 2008. " Quantification of Viscoelastic behavior of High Molecular weight polymers used chemical enhanced oil recovery" MS thesis, UT Austin
25. Magueur, A., Moan, M. and Chauveteau, G. 1984. Effect of Successive Contractions and Expansions on the apparent viscosity of Dilute Polymer Solutions. *Chem. Eng. Commun.* 36(1-6): 351-366.
26. Mansour, A. M., et al. 2014 in-situ rheology and mechanical degradation of EOR polyacrylamide solutions under moderate shear rate. Journal of Petroleum science and engineering 115; 57-65
27. Masuda, Y., Tang, K. C., Miyazawa, M. et al. 1992. 1D Simulation of Polymer flooding including the viscoelastic effect of Polymer solutions. *SPE Res Eng,* 7(02): 247-252. SPE 19499-PA.
28. Marshall, R. J and Metzner, A. B. 1967. Flow of viscoelastic fluids through Porous media. Ind. And Eng. Chem. Fundamentals, 6, 393
29. McKinley, G. H., and T. Sridhar. 2002. Filament-stretching rheometry of complex fluids. *Annu. Rev. Fluid Mech.* 34, 375-415.
30. McKinley, G. H. 2005. Visco-Elastic-Capillary Thinning and Breakup of Complex Fluids. *Rheol. Reviews.* 1-48.
31. Martischius, F. D., 1982. The rheological behavior of polymer solutions: flow consolidation in shear and expansion flows. *Rheol. Acta,* 21 (03); 288-310.
32. Mu, W. Z., 2005. The Numerical Simulation Study of Viscoelastic Polymer Displacement. Daqing Petroleum Institute.
33. Pengpeng Qi., Daniel, H. E., Heesong, K et al. 2016 "Reduction of residual oil saturation in Sandstone cores using Viscoelastic polymers" SPE 179689 presented at SPE IOR symposium, Tulsa, Okla. April 11-13.
34. Plog, J. P., Kulicke, W. M and Clasen, C. 2004. Influence of the Molar mass distribution on the Elongational Behavior of Polymer Solutions in Capillary Break up. Appl. Rheol. 15 (1): 28-37
35. Pye, D. J. 1964. Improved Secondary Recovery by Control of Water Mobility. *JPT* 16 (08): 911-916. SPE 845-P.
36. Ranjbar, M., Rupp, J., Pusch, G and Meyn R. 1992 "Quantification and Optimization of Viscoelastic effects of Polymer solutions for Enhanced oil recovery" SPE 24154 presented at SPE $8^{th}$ IOR symposium, Tulsa, Okla., April, 22-24
37. Rodd, L. E., Scott, T. P., Cooper-White, J. J. et al. 2005. Capillary Breakup Rheometry of Low-viscosity Elastic Fluids. *Appl. Rheol.* 15(1): 12-27.

38. Schummer, P. and Tebel, K. H. 1983. A new elongational rheometer for polymer solutions. *J. Non-Newtonian Fluid Mech.* 12 (3): 331-347.
39. Seright, R. S., Seheult, M., Kelco, C. P. et al. 2009. Injectivity characteristic of EOR polymers. *SPE Res Eval & Eng* 12(5): 783-792. SPE 115142-PA.
40. Seright, R. S., Fan, T., Wavrik, K. et al. 2011. Rheology of a New Sulfonic Associative Polymer in Porous Media. *SPE Res Eval & Eng. J.* 14(06), 726-734. SPE-141355-PA.
41. Sheng, J. J. 2010. Modern Chemical enhanced oil recovery; Elsevier: Burlington. p. 101-238.
42. Smith, F. W *The behaviour of partially hydrolysed polyacrylamide solutions in porous media*, J. Petro. Tech., 22(1970), 148-156
43. Stavland, A., Jonsbraten, H. C., Lohne, A. et al. 2010. Polymer flooding—Flow Properties in Porous Media versus Rheological Parameters. Presented at SPE EUROPEC/EAGE Annual Conference and Exhibition, Barcelona, 14-17 Jun. 2010. SPE-131103-MS.
44. Taha, S. 2010. Non-newtonian flow in Porous media. *Polymer* 51 (22) 5007-5023.
45. Wang, W. Y. 1994. Viscoelasticity and Rheological Property of Polymer Solution in Porous Media. Journal of Jianghan Petroleum Institute.
46. Yin H. J., et al. 2006. Study of Flow Behavior of Viscoelastic Polymer Displacement in Micropore with Dead end. Presented at SPE Annual Technical Conference and Exhibition, San Antonio, 24-27 September. SPE 101950-MS
47. Yuan, M., 1981. "A Rheological study of Polymer and microemulsion in porous media" MS thesis, UT Austin.

The invention claimed is:

1. An improved method of recovering oil from a depleted oil reservoir wherein oil is embedded in an underground matrix adjacent the depleted oil reservoir, the improved method comprising injecting a mixture of polymeric material into the depleted oil reservoir through an injection borehole, applying a pressure to the mixture of polymeric material to free the oil from the undergrouund matrix and move the oil towards a production well, and drawing the oil from the depleted oil reservoir through the production well; and modeling a shear thickening of the mixture of polymeric material and an onset of shear thickening according to:

$$\mu_{app} = \mu_\infty + (\mu_p^o - \mu_\infty)[1 + (\lambda*\gamma)^\alpha]^{\frac{(n-1)}{\alpha}} + \mu_{max,De_{cr-0.66}}^{0.35}[1 - \exp(-(\beta*\tau_{ext}*\gamma)^{n_2-1.2-1})]$$

where:
$\mu_{app}$=Apparent viscosity, Pa·s;
$\mu_\infty$=Upper Newtonian viscosity, Pa·s;
$\mu_p^o$=Lower Newtonian viscosity, Pa·s;
$\lambda$=Characteristic relaxation time, s;
$\gamma$=Shear rate, /s;
n=Shear thinning index;
$\alpha$=Constant equal to 2;
$\mu_{max,De_{cr-0.66}}$=Maximum empirical elongation viscosity at the critical Deborah number of 0.66;
$n_2$=Strain hardening index;
$\beta$=Universal constant equal to 0.01; and
$\tau_{ext}$=Extensional relaxation time, s.

2. The improved method of claim 1 wherein the mixture of polymeric material includes a viscoelastic polymer and water.

3. The improved method of claim 2 wherein the viscoelastic polymer is a synthetic viscoelastic polymer.

4. The improved method of claim 2 wherein the viscoelastic polymer is a hydrolyzed polyacrylamide (HPAM).

5. The improved method of claim 1 wherein the depleted oil reservoir is defined by a porous rock formation.

6. The improved method of claim 1 wherein the underground matrix is formed of porous rock.

7. The improved method of claim 1 wherein the depleted oil reservoir exhibits a permeability of no more than 37 Darcy.

8. The improved method of claim 1 wherein the depleted oil reservoir contains viscous oil.

9. The improved method of claim 1 wherein modeling the shear thickening of the polymeric mixture and the onset of the shear thickening avoids use of a core sample.

10. The improved method of claim 1 wherein the shear thickening of the polymeric mixture and the onset of the shear thickening are modeled at a shear rate greater than 100.

* * * * *